R. THOMPSON.
MACHINE FOR STRINGING SEED CORN.
APPLICATION FILED SEPT. 27, 1916.
1,252,200.
Patented Jan. 1, 1918.
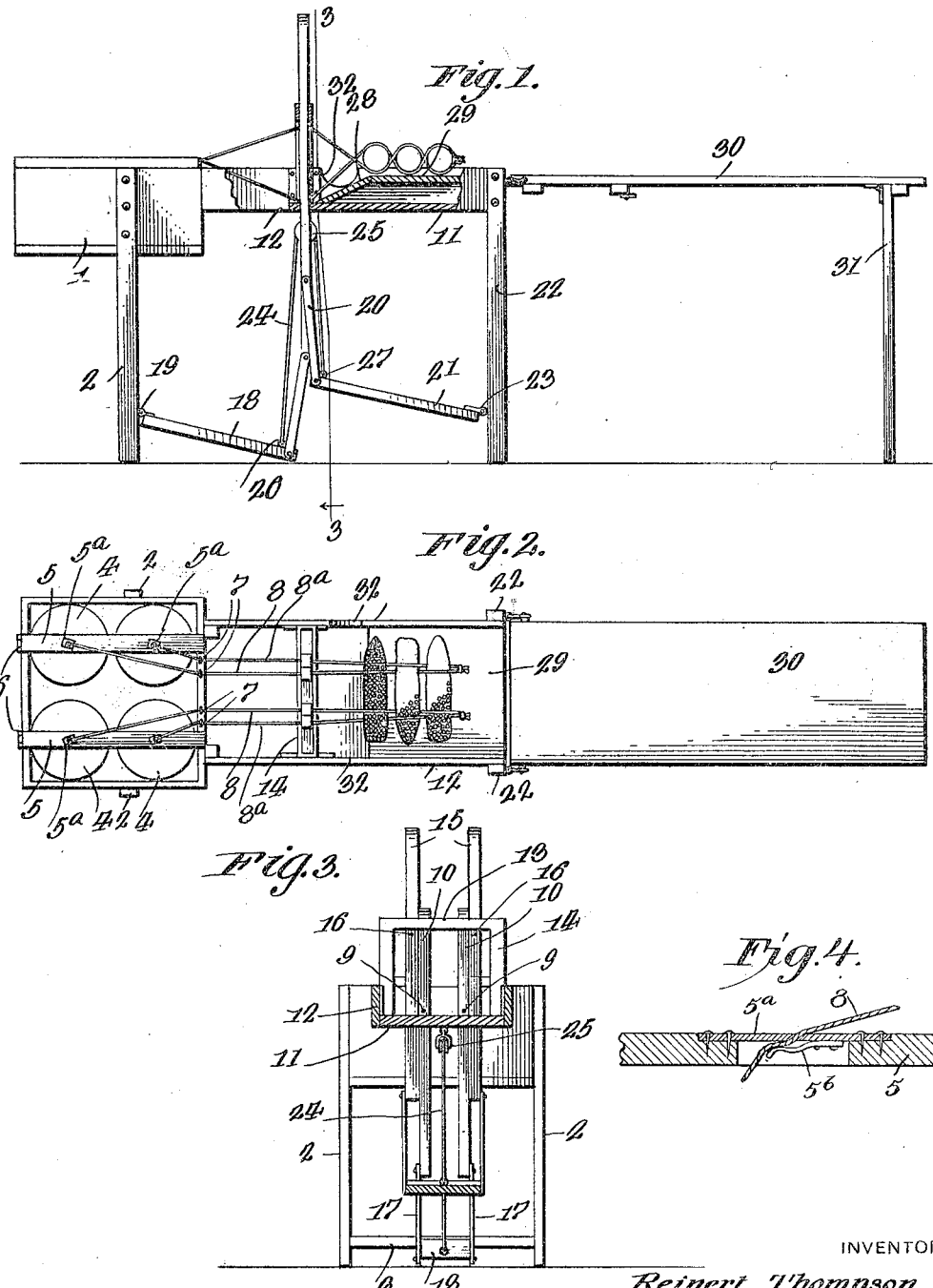
INVENTOR
Reinert Thompson
WITNESSES
Guy M. Spring
H. H. Babcock
BY Richard B. Owen
ATTORNEY

UNITED STATES PATENT OFFICE.

REINERT THOMPSON, OF WAUTOMA, WISCONSIN.

MACHINE FOR STRINGING SEED-CORN.

1,252,200.  Specification of Letters Patent.  Patented Jan. 1, 1918.

Application filed September 27, 1916. Serial No. 122,450.

*To all whom it may concern:*

Be it known that I, REINERT THOMPSON, a citizen of the United States, residing at Wautoma, in the county of Waushara and State of Wisconsin, have invented certain new and useful Improvements in Machines for Stringing Seed-Corn, of which the following is a specification.

This invention relates to machines for stringing seed corn, and more particularly to a machine whereby two pairs or sets of cords are interlaced alternately about ears of corn placed between the same.

In saving corn and similar grain for seed the simplest and most efficient method now in use is to place the ears of corn between two strings which have been doubled and passed about the ears in alternate directions so as to secure the ears in spaced relation thus permitting free passage of air between the ears of corn so as to insure proper curing of the same. This corn is formed in "strings" which are hung in any suitable place until planting time. The ears of corn are now commonly secured in this manner manually. The main object of my invention is to provide a machine of simple construction and operation whereby one person can quickly and easily form these strings of corn. A further object is to provide a machine having means for moving spaced pairs of strings or cords alternately in opposite directions so as to secure ears of corn in the manner above described. Further objects will appear from the detail description.

In the drawings:

Figure 1 is a front view of the machine partly in section,

Fig. 2 is a top plan view of the same,

Fig. 3 is a section on line 3—3 of Fig. 1.

Fig. 4 is a fragmentary detail sectional view of one of the holding bars and the cord tensioning device carried thereby.

A twine box 1 is supported by suitable legs 2 secured thereto at their upper ends and held in spaced relation at their lower ends by a cross bar 3. This box is adapted to contain four balls 4 of cord or twine, binder twine being preferred. Two bars 5 are hingedly secured at their outer ends to the upper edge of box 1, as at 6. These bars are adapted to be folded downward over the top of the balls 4 of twine, and each bar is provided with two spaced apertures adapted to receive the cord from the twine balls. This cord is passed through eyes 7 secured in the top of the inner side of the box 1. The cords 8 which are taken from the two outer balls 4 are passed through the two inner eyes 7 which are in the same vertical plane as the bores 9 through the inner slidable rods 10. These rods are slidable through openings through the bottom 11 of the center frame 12 which is of trough-like construction and through the top bar 13 of a U guide frame 14 secured at the center of frame 12. A pair of outer rods 15 are slidably mounted through the bottom 11 of frame 12 closely adjacent the bars 10. The bars 15 are each provided with a bore 16 through which are passed the cords 8ª taken from the two inner balls 4.

The lower end of each bar 10 is pivotally connected to the upper end of a link 17 the lower end of which is pivotally secured to the inner end of a treadle 18 the outer end of which is hinged to the legs 2 of twine box 1, as at 19. The lower ends of bars 15 are similarly secured by links 20 to the inner end of a treadle 21 which is hinged to the supporting legs 22 as at 23. A short cable 24 is passed over a pulley 25 suspended from the bottom 11 of center frame 12 between the bars 10. One end of this cable is secured to the treadle 18, near the inner end thereof as at 26, and the other end of the cable is secured to treadle 21 at 27. By this arrangement, when one treadle is depressed, the bars connected thereto will be moved downward, and the other treadle will be simultaneously moved upward so as to raise the bars connected to the same.

On the side of the U frame 14 remot from the twine box 1, an upwardly and outwardly inclined board 28 is secured in the center frame 12 and extends the full width of the same. The upper end of this board is flush with the upper face of a horizontal board 29 which extends rearward in frame 12. This board 29 extends to the end of the frame. A table 30 is adapted to be secured to the end of center frame 12 adjacent the outer end of board 29 and is supported by legs 31 hingedly secured thereto. This table is adapted to form a continuation of the board 29 to receive the string of corn as it moves outwardly from the machine. In using my machine, the strings 8 and 8ª are passed through the bores 9 and 16 of the bars 10 and 15. The ends of the two adjacent strings 8 and 8ᵃ are tied together thus constituting in effect a single string which is doubled back on itself. An ear of corn is then placed in the arcuate recess 32 formed in the front wall of the center frame in alinement with the inclined board 28. By depressing the treadle 18, the two inner rods 10 are moved downwardly thus pulling the cords 8 downward and lifting the cords 8ᵃ. When the cords are in this position a second ear of corn is inserted between them being reversed relatively to the first ear, after which the treadle 21 is depressed so as to raise the cords 8 and lower the cords 8ᵃ. This alternate raising and lowering of the cords continues, an ear of corn being inserted after each operation, until a string of the desired length has been formed. When this has been done the cords are cut and are tied together so as to suspend the string thus formed in any suitable place. The free ends of the cords are then tied together as at first, a second string being formed. In the strings which are thus formed the butts and tips of the ears are alternated so as to insure proper tension of the string, in the usual manner.

To prevent the string from becoming loose, each of the bars 5 is provided with a plate 5ᵃ which is positioned in vertical alinement with the approximate center of the ball 4 located beneath the same. This plate carries on its under-face a spring clip which presses lightly on the cord as it is taken from the ball. This clip 5ᵇ serves to maintain the cord at tension at all times thus insuring proper operation of the machine.

There may be changes made in the construction and arrangement of the different parts of my invention without departing from the field and scope of the same, and I intend to include all such variations, as fall within the appended claims, in this application in which a preferred form only of my invention is disclosed.

What I claim is:

1. A machine for stringing seed corn having a frame, a pair of bars slidable therein, a treadle hingedly secured at one end to the frame and pivotally connected at the other end to the lower ends of said bars, a second pair of bars slidable in the frame closely adjacent the first mentioned pair of bars, a treadle hingedly secured at one end to the frame and pivotally connected at the other end to the said second pair of bars, and connections between the said treadles whereby when one treadle is depressed the other treadle is simultaneously raised.

2. A machine for stringing seed corn having a frame, a pair of bars slidable therein, a treadle hingedly secured at one end to the frame and pivotally connected at the other end to the lower ends of said bars, a second pair of bars slidable in the frame and closely adjacent the first mentioned pair of bars, a treadle hingedly secured at one end to the frame and pivotally connected at the other end to the said second pair of bars, a pulley secured to the upper portion of said frame mid-way between the bars of the first mentioned pair of bars, and a cable passed over said pulley and secured to the inner ends of said treadles.

3. A machine for stringing seed corn having a center frame of trough-like construction, a U-shaped guide frame secured at the approximate center of said center frame, an inner pair of bars slidable through said center and guide frames, an outer pair of bars slidably mounted adjacent the inner pair of bars, a horizontal board secured in the center frame adjacent the outer end thereof adapted to receive and support ears of corn as they are strung, a downwardly and inwardly inclined board intermediate said U-guide frame and the horizontal board, and means for causing simultaneous and opposite movement of said pairs of bars.

In testimony whereof I affix my signature in presence of two witnesses.

REINERT THOMPSON.

Witnesses:
GEORGE P. SORENSEN,
H. J. EAGAN.